United States Patent [19]

Otsu et al.

[11] Patent Number: 5,314,962
[45] Date of Patent: May 24, 1994

[54] ABA TYPE BLOCK COPOLYMERS

[75] Inventors: Takayuki Otsu, Nara; Shunichi Himori, Yokkaichi; Takashi Kiriyama, Tokyo, all of Japan

[73] Assignee: Mitsubishi Petrochemical Company Limited, Tokyo, Japan

[21] Appl. No.: 83,326

[22] Filed: Jun. 29, 1993

Related U.S. Application Data

[63] Continuation of Ser. No. 707,950, May 28, 1991, abandoned, which is a continuation of Ser. No. 549,644, Jul. 6, 1990, abandoned, which is a continuation of Ser. No. 178,222, Apr. 6, 1988, abandoned.

[30] Foreign Application Priority Data

Apr. 7, 1987 [JP] Japan .................................. 62-83926
Mar. 18, 1988 [JP] Japan .................................. 63-65494

[51] Int. Cl.$^5$ .................. C08F 293/00; C08F 297/00; C08F 2/48
[52] U.S. Cl. ...................... 525/280; 525/294; 525/299; 525/92; 525/94; 522/57; 522/116; 522/176; 522/182; 522/183
[58] Field of Search ................ 522/57, 116, 176, 182, 522/188; 525/92, 94, 280, 294, 299

[56] References Cited

U.S. PATENT DOCUMENTS 3,287,298 11/1966 D'Alelio ............................. 525/294
4,045,517 8/1977 Guerin et al. ........................ 525/211

FOREIGN PATENT DOCUMENTS 0286376 10/1988 European Pat. Off. .
161484 12/1991 Japan ................................... 525/94

OTHER PUBLICATIONS

Polymer Bulletin, vol. 7, pp. 197-203, 1982, T. Otsu, et al., "Efficient Synthesis of Two or Multi Component Block Copolymers through Living Radical Polymerization with Polymeric Photoiniferters".

Otsu et al, "Living Mono and Biradical Polymerizations in Homogeneous System Synthesis of AB and ABA Type Block Copolymers" Polymer Bulletin 11, 135-142, (1984).

*Primary Examiner*—Susan Berman
*Attorney, Agent, or Firm*—Oblon, Spivak, McClelland, Maier & Neustadt

[57] ABSTRACT

An acrylate is polymerized by the photo-decomposition of

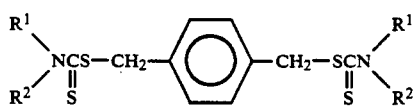

to make a polymeric intermediate containing dithiocarbamate groups at both its ends, and a hard polymer-forming monomer is polymerized by the photo-decomposition of this dithiocarbamate group-containing polymeric intermediate to form blocks of a polymer of said hard polymer-forming monomer on both sides of said polymeric intermediate, thereby forming an ABA type block copolymer.

17 Claims, No Drawings

ABA TYPE BLOCK COPOLYMERS

This application is a continuation of application Ser. No. 07/707,950, filed May 28, 1991, now abandoned, which is a continuation of application Ser. No. 07/549,644, filed Jul. 6, 1990, now abandoned, which is a continuation of application Ser. No. 07/178,222, filed Apr. 6, 1988, now abandoned.

BACKGROUND OF THE INVENTION

1. Field of the Invention

The present invention relates to a block copolymer with rubber elasticity. More specifically, the instant invention is concerned with an ABA type block copolymer having an acrylic ester residue in its intermediate block, which may be used in applications wherein the (raw or starting materials used are required to possess rubber elasticity, for instance, as the (raw or starting) materials for elastomers, sealants, packings, adhesives, solvent type adhesive materials, hot-melt adhesive materials, heat sealants, vibration-proof materials, sound absorbers, solings, sports goods, toys, hoses, tubes, automotive parts and so on.

2. Prior Art

In many cases, block copolymers possess the properties inherent in their constitutional blocks.

Development of block copolymers having an acrylic ester residue in their intermediate blocks has thus been potentially expected because of an acrylic ester excelling in flexibility, weather resistance and chemical resistance. Until now in regard to block copolymers having an intermediate block of acrylic ester residues and their preparation, however, only the block copolymer synthesized with a polymeric peroxide has been proposed in, e.g., Japanese Patent Laid-Open Publication No. 61(1986)-287915.

However, the block copolymer proposed in that publication is a so-called AB type diblock copolymer. In general, the AB type diblock copolymer is free from elastic nature, say, rubber elasticity, since although one block is under constraint as a frozen or crystalline phase, yet the other is free. For that reason, such a diblock copolymer could not be used in various applications in which rubber elasticity is required, as already mentioned.

SUMMARY OF THE INVENTION

An object of the present invention is to provide a solution to the aforesaid problem. According to the present invention, it has now been found that an ABA type block copolymer having an acrylic ester residue in its intermediate block combines excellent flexibility, weathering resistance, chemical resistance, etc., which acrylic ester polymers possess, with elastic nature, i.e., rubber elasticity.

More specifically, the ABA type block copolymers of the present invention are represented by the following formula I.

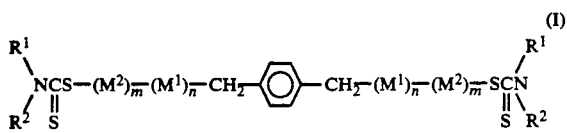

wherein:

two $R^1$s, which may be different or identical, are each a hydrocarbyl group having 1 to 3 carbons, two $R^2$s, which may be different or identical, are each a hydrogen atom or a hydrocarbyl group having 1 to 3 carbon atoms, $M^1$ is an acrylic ester residue represented by:

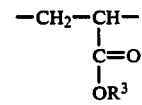

wherein $R^3$ is a hydrocarbyl group having 1 to 18 carbon atoms, which may or may not be replaced with an alkoxy or hydroxy group, $M^2$ is a methacrylic acid or ester residue represented by:

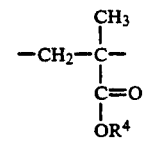

wherein $R^4$ is a hydrocarbyl group having 1 to 18 carbon atoms or a hydrogen atom; an aromatic vinyl residue represented by:

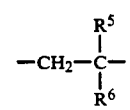

wherein $R^5$ is an hydrogen atom or a methyl group, and $R^6$ is a phenyl or alkylphenyl group; or a maleimido residue represented by:

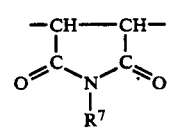

wherein $R^7$ is a hydrocarbyl group having 1 to 12 carbon atoms, or a phenyl or alkylphenyl group, and n and m each are a natural number of 20 to 5000.

According to the present invention, there are provided ABA type block copolymers having an acrylic ester residue in their intermediate blocks, which possess elastic nature, i.e., rubber elasticity, in addition to flexibility, weathering resistance, chemical resistance and the like.

DETAILED DESCRIPTION OF THE INVENTION (1) Blocks A and B

In the present disclosure, the term "residue" defined in Formula I shall refer to a repeating unit wherein vinyl group-containing monomers are bonded together by addition polymerization.

It is generally known that ABA triblock copolymers, which contain a polymer block B (a soft or flexible chain) as an intermediate block and rigid polymer blocks A (hard or rigid chains) as both end blocks, possess rubber elasticity. (See "Application Note for Rubber.Elastomer", edited by Society for the Research of Rubber.Elastomer, page 24, etc.).

In the present invention, the acrylic ester residue forming the intermediate block B of the block copolymer is flexible and forms a soft polymer block due to the structure that a carboxylic ester having a high degree of freedom in view of conformation is bonded to the backbone chain of the polymer as a side chain.

On the other hand, the methacrylic ester residues forming both end blocks A of the block copolymer are rigid and form hard polymer blocks. The reason is that the microbrownian and rotary motions of such blocks are as a whole prevented due to the structure that a methyl group and a carboxylic ester group are simultaneously bonded to the same carbon atom of the backbone chain of the polymer. Similarly, the aromatic vinyl residue is of the structure that a voluminous aromatic having a low degree of freedom in view of conformation is bonded to the backbone chain of the polymer, while the maleimido residue is of the structure that the backbone chain of the polymer is of a five-membered ring structure having a low degree of freedom in view of conformation. Thus, they become rigid and form hard polymer blocks because of their microbrownian and rotary motions being prevented.

It is thus appreciated that the ABA type triblock copolymers of the present invention, as represented by Formula I, contain a soft chain as the intermediate block B and hard chains as both end blocks A with the result that they provide ABA block copolymers capable of possessing rubber elasticity.

(2) Monomers of Blocks A and B

As the block B-forming monomers, as can be defined by $M^1$ in Formula I:

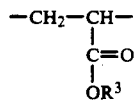

wherein $R^3$ stands for a hydrocarbyl group having 1 to 18, preferably 3 to 9, carbon atoms or a hydrocarbyl group having 1 to 18, preferably 2 to 10, carbon atoms which has a substituent that is an alkoxy group (having preferably about 1 to 10 carbon atoms) or a hydroxyl group, mentioned are acrylic esters such as methyl acrylate, ethyl acrylate, n-butyl acrylate, iso-butyl acrylate, hexyl acrylate, iso-octyl acrylate, 2-ethylhexyl acrylate, iso-nonyl acrylate, decyl acrylate, stearyl acrylate, hydroxyethyl acrylate, 2-methoxyethyl acrylate, 2-ethoxyethyl acrylate, 2-butoxyethyl acrylate, pentaethylene glycol acrylate monomethyl ether, diethylene glycol acrylate monoethyl ether and diethylene glycol acrylate monobutyl ether.

It is understood, however, that the block B can contain residues such as acrylic acid, methacrylic acid, aromatic vinyl derivative and vinyl acetate residues in such small amounts that the properties which the acrylic ester residue possesses, i.e., flexibility, weathering resistance and chemical resistance are not impaired. More definitely, the amount of such residues incorporated is less than 5 parts by weight with respect to 100 parts by weight of the acrylic ester forming the intermediate block.

As the monomers providing the methacrylic ester or acid residues to form the block A, as can be defined by $M^2$ in Formula I:

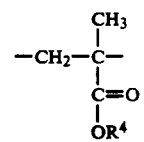

wherein $R^4$ stands for a hydrocarbyl group having 1 to 18 carbon atoms or a hydrogen atom, mentioned are methyl methacrylate, ethyl methacrylate, n-butyl methacrylate, iso-butyl methacrylate, tertiarybutyl methacrylate, methacrylic acid and so on.

As the monomers forming the aromatic vinyl residue, as can again be defined by $M^2$ in Formula I:

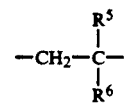

wherein $R^5$ stands for a hydrogen atom or a methyl group, and $R^6$ denotes a phenyl or alkylpheny group, mentioned are styrene, para-methylstyrene, ortho-methylstyrene, α-methylstyrene, β-methylstyrene and so on.

As the monomers providing the maleimido residues, as can still again be represented by $M^2$ in Formula I:

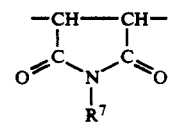

wherein $R^7$ stands for a hydrocarbyl group having 1 to 12, preferably 1 to 6, carbon atoms or a phenyl or alkylphenyl group, mentioned are maleimides such as N-methylmaleimide, N-ethylmaleimide, N-laurylmaleimide, N-phenylmaleimide, N-o-methylphenylmaleimide for example.

As is the case with the block B, the blocks A can contain less than 5 weight % of such nonessential monomers as mentioned in connection with the block B in addition to the essential monomers.

Further, $M^2$ may comprise not only one of these three essential monomers but also two or more thereof (and optionally the aforesaid nonessential monomers).

It is understood that, when two blocks A are present, they are usually identical with each other in view of the preparation method to be described later, but may possibly be different from each other.

(3) Preparation

The block copolymers of the present invention should preferably be synthesized with the use of an initiator having a plurality of dithiocarbamate groups.

Synthesis per se of the ABA type block copolymers using such an initiator having dithiocarbamate groups has already been known in the art. (For instance, see "Polymer Preprint, Japan", Vol. 32 No. 6(1983), p. 1047).

The present ABA type block copolymer having its intermediate block B comprising a specific residue and both its end blocks A comprising specific residues, as obtained by making use of the reaction that is known per se, are more definitely synthesized by the following two-stage polymerization.

The acrylic ester is first photopolymerized in the first-stage polymerization using a dithiocarbamate compound represented by the general formula II:

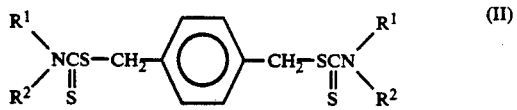

wherein two $R^1$s, which may be different or identical, are a hydrocarbyl group having 1 to 3 carbon atoms, and two $R^2$s, which may be identical or different, are a hydrogen atom or a hydrocarbyl group having 1 to 3 carbon atoms, whereby an acrylic ester polymer dithiocarbamated at both its ends is obtained, as represented by the following general formula III:

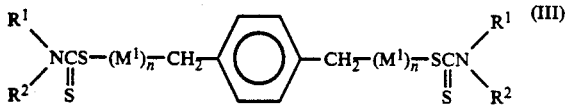

wherein $R^1$ and $R^2$ have the same meanings as above, $M^1$ denotes an acrylic ester residue, and n indicates a natural number of 20 to 5,000.

It is noted that n in Formula III, viz., the number of residues contained in the polymer is determined by the molar ratio of the dithiocarbamate compound used and the acrylic ester monomer used. For instance, if the molar ratio of the dithiocarbamate compound and the monomer is 1:20, then n is 20. Similarly, if that molar ratio is 1:5,000, then n is 5,000.

For the next or second-stage polymerization, the monomer for $M^2$, viz., the methacrylic ester, maleimido or aromatic vinyl derivative is photopolymerized, using the acrylic ester polymer dithiocarbamated at both its ends per se as an initiator, whereby the ABA type block copolymer represented by Formula I can be obtained. The number of residues in the terminal high-molecular chain, as defined by m in Formula I, is determined by the molar ratio of the acrylic ester polymer dithiocarbamated at both its ends and the monomer used for the second-stage polymerization, such as a methacrylic ester. For instance, if the molar ratio of the acrylic ester polymer and the monomer is 1:20, then m is 20. Similarly, if that molar ratio is 5,000, then m is 5,000.

Both the first and second polymerization stages are usually carried out with ultraviolet rays having the wavelength required for the decomposition/radical generation of said dithiocarbamate, e.g., 300 to 500 nm. Provided that light reaches the dithiocarbamate groups that are the initiation sites in the first- and second-stage polymerizations, any one of bulk, solution, suspension, dispersion, slurry or emulsion polymerization technique can be used.

As solvents to be used for both the first and second polymerization stages when these stages are carried out in solution polymerization are preferably used such solvents that have no absorption of the ultraviolet at 300 to 500 nm, have a small chain transfer constant and can dissolve well the monomer and the polymer produced therefrom. Solvents which are suitable are hydrocarbons such as benzene, toluene, xylene, ethylbenzene, hexane and heptane; ketones such as acetone and methyl ethyl ketone; esters such as ethyl acetate; amides such as dimethylformamide; and alkanols such as isopropanol and butanol.

The atmosphere during the polymerization and the polymerization temperature are preferably those employed in an usual radical polymerization, e.g. preferable at a temperature of 10° to 150° C. under inert gas such as nitrogen or argon.

In the ABA type block copolymers of Formula I, the end blocks A cannot function as the constrained phase, when the number m of the residue units therein is less than 20. When that number exceeds 5,000, on the other hand, no rubber elasticity can be obtained because of the proportion of the constrained phase increasing relatively. Further, the ABA type block copolymers of Formula I cannot show any rubber elasticity, when the number n of residue units in the intermediate block B is less than 20, while they degrade in flowability and moldability, when that number exceeds 5,000.

Dithiocarbamate groups on both the ends of the block copolymer produced can be made inactive to the ultraviolet by a post treatment. The block copolymer may be made inactive to ultraviolet by, for example, heat treating the block copolymer for several minutes at a temperature of 250° C. or higher or by treating the block copolymer with acidic or alkaline solution. Alternatively, the carbamate terminals of the block copolymer can be substituted by UV-insensitive groups by, for example, adding under irradiation of the ultraviolet a chemical which has a large chain transfer constant such as a thiol compound.

EXAMPLES AND COMPARATIVE EXAMPLES

The present invention will now be explained in more detail with reference to the examples and comparative examples; however, it is understood that the present invention is never limited thereto.

Example 1

Two point four (2.40) g of p-xylylene bis(N,N-diethyldithiocarbamate) (hereinafter abbreviated to XDC) represented by the following structural formula:

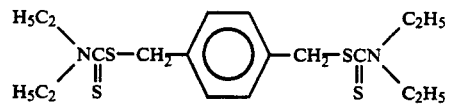

was dissolved in 553 g of butyl acrylate, and put in a pyrex vessel of 1 liter, which was sufficiently replaced therein with nitrogen and then plugged. The vessel was thereafter located at a position spaced away 15 cm from a 400-watt ultraviolet lamp (a mercury lamp H400L manufactured by Toshiba, Co., Ltd.) for about 10-hour irradiation. After that irradiation, gas chromatography indicated that the amount of the butyl acrylate monomer remaining in the polymer product was 1.5%; the conversion of butyl acrylate was 98.5%. Liquid chromatography also indicated that any XDC was not detected from the polymer product whatsoever. Hence, all the XDC is considered to be added to the butyl acrylate polymer, and the product is a polymer containing a soft polymer block and dithiocarbamated at both its ends.

Gel permeation chromatography of the polymer product obtained in a yield of 547 g revealed that its molecular weight was 93,000 in terms of a number-average molecular weight (Mn) and 174,800 in terms of a weight-average molecular weight (Mw), both calculated as polystyrene. The value of n in Formula I is 800.

Next, 240 g of this polymer product was put in the same glass vessel as above, into which 60 g of methyl methacrylate (manufactured by Mitsubishi Rayon, Co., Ltd. and sold in the name of Acryl Ester M) and 300 g of toluene were added, well-mixed and dissolved. The product was polymerized by 10-hour ultraviolet irradiation under the same conditions as above.

Gas chromatography of the polymer solution indicated that the amounts of the methyl methacrylate and butyl acrylate monomers remaining therein were 1.0% and 0.5%, respectively; the final conversion of the monomers was 98.5%. This polymer in solution was reprecipitated from 10 liters of hexane and dried under reduced pressure to obtain 276 g of a polymer product, which was found to have a molecular weight Mn of 115,000 and a molecular weight Mw of 256,000. At 175° C. and a shear rate of 1000 sec$^{-1}$, this block copolymer had a melt viscosity of $4.4 \times 10^2$ poise (P), which permits it to be satisfactorily molded by an existing hot-melt molding machine. The value of m in Formula I is about 250.

The following thermochemical examination (1) and morphological observation (2) of the molecular structure of the polymer product revealed that it was an ABA type resin including hard polymer blocks A having a Tg of 104° C. and a soft polymer block B having a Tg of −54° C.

(1) Thermochemical Examination

As a result of calorimetry of the polymer product with a differential scanning calorimeter (hereinafter abbreviated to DSC), glass transition points were observed at −54° C. and 104° C., but any other specific point could not be detected. The glass transition points of −54° C. and 104° C. are derived from the butyl acrylate and methyl methacrylate polymer blocks, respectively.

Thus, it has turned out that this resin product is a block copolymer or a noncompatible polymer blend, rather than a random copolymer or a compatible polymer blend to say the least.

For that reason, this resin product was subjected to morphological analysis so as to ascertain whether it was a block copolymer or a noncompatible polymer blend.

(2) Morphological Analysis

Morphological analysis of the polymer product under a phase-contrast microscope or a scanning electron microscope (hereinafter abbreviated to SEM) indicated a microphased structure with domains of 500 Å or lower in diameter. Such a microphased structure is characteristic of a block copolymer (Akiyama, Inoue and Nishi, "Polymer Blend", pp. 169, 1981).

For the purpose of comparison, 80 parts by weight of a butyl acrylate homopolymer wherein Mn was 95,000 and Mw was 176,000, synthesized from XDC in the same apparatus as used in Example 1 and 20 parts by weight of a methyl methacrylate homopolymer wherein Mn was 9,100 and Mw was 18,300, synthesized in a similar manner, were kneaded together at 200° C. and 100 rpm for 5 minutes in a Brabender Plastomill. Similar morphological observation of the resulting product indicated a macrodomain structure with domains of 100μ or higher in diameter. This was a typical noncompatible polymer blend with the structure being quite different from the microdomain structure of the aforesaid polymer product.

From the results determined by the two means as mentioned above, it is evident that the polymer product obtained in Example 1 is a block copolymer. Taking into further consideration the fact that the polymerization initiator used was a polymer dithiocarbamated at both its ends, the polymer product obtained was thus identified as an ABA type block copolymer comprising a butyl acrylate homopolymer B having a Tg of −54° C. and methyl methacrylate homopolymers A having a Tg of 104° C.

The quantity of the monomers polymerized into the block determined by treating the polymer product with acetone for the extraction of the homopolymers was 88.0%.

The properties of the synthesized block copolymers were estimated by tensile and chemical resistance testings, the results of which are set forth in Table 1. The conversion of monomers, quantity of monomers polymerized into the block, melt index of polymers and the like are also set forth in Table 1.

Example 2

A block copolymer was synthesized in a similar manner as described in Example 1, except that 60 g of styrene was used in place of 60 g of methyl methacrylate. A polymer wherein molecular weight Mn was 131,000 and Mw was 265,000 was obtained in a yield of 263 g.

The structure of the polymer product was identified with similar procedures as described in Example 1. Calorimetry indicated that there was nothing but Tgs of −54° C. and 100° C. arising from the butyl acrylate and styrene homopolymers. Morphological analysis also identified the polymer product as a block copolymer. From the aforesaid results and the fact that the initiator was bifunctional, it has turned out that the polymer product is an ABA type block copolymer comprising a butyl acrylate homopolymer block B and styrene homopolymer blocks A.

The properties, etc. of this block copolymer are set forth in Table 1.

Example 3

A block copolymer was synthesized in a similar manner as described in Example 1, except that a mixed liquid of 30 g of N-phenylmaleimide and methyl 0 methacrylate were used in place of 60 g of methyl methacrylate. A polymer wherein molecular weight Mn was 130,000 and Mw was 262,000 was obtained in a yield of 261 g.

The structure of the polymer product was identified with similar procedures as described in Example 1. Calorimetry indicated that there was nothing but Tgs −54° C. and 177° C. arising from the butyl acrylate homopolymer and the random copolymer of N-phenylmaleimide and methyl methacrylate. Morphological analysis also identified the polymer product as a block copolymer. From the aforesaid results and the fact that the initiator was bifunctional, it has turned out that the polymer product is an ABA type block copolymer comprising a butyl acrylate hompolymer block B and N-phenylmaleimide/methyl methacrylate random polymer blocks A.

The properties, etc. of this block copolymer are set forth in Table 1.

Comparative Example 1

The properties of commercially available acrylic rubber (Toacron AR-701 manufactured by Toa Paint Co., Ltd.) were measured, and are set forth in Table 1 for the purpose of comparison.

Comparative Example 2

The properties of commercially available thermoplastic elastomer (Kaliflex TR1117 manufactured by Shell Chemical Co., Ltd.) were measured, and are set forth in Table 1.

applied onto a polyester film of 25μ in thickness to a coating thickness of 30μ with a roll coater, thereby preparing an adhesive tape, the properties of which were as set forth in Table 2. The rate of conversion of monomers, quantity of monomers polymerized into the block, melt index of polymer and the like are also set forth in Table 2.

TABLE 1

|  | Ex. 1 | Ex. 2 | Ex. 3 | Comp. Ex. 1 | Comp. Ex. 2 |
|---|---|---|---|---|---|
| Final Conversion of Monomers (%) | 98.5 | 98.0 | 98.0 | — | — |
| Quantity of monomers polymerized into the block (%) | 88.0 | 86.0 | 86.0 | — | — |
| Melt Viscosity (P)*1 (175° C., $10^3$ sec$^{-1}$) | $4.4 \times 10^2$ | $4.6 \times 10^2$ | $6.0 \times 10^2$ | — | $2.0 \times 10^3$ |
| Tensile Strength (kg/cm$^2$)*2 | 135 | 135 | 145 | 120 | 200 |
| Tensile Elongation (%)*2 | 1500 | 1400 | 1800 | 1300 | 1200 |
| Tensile Stress*2 (300% hr, kg/cm$^2$) | 6 | 6 | 7 | 5 | 6 |
| Weathering Resistance (%)*3 | 81 | 76 | 80 | 80 | 46 |
| Chemical Resistance*4 |  |  |  |  |  |
| Gasoline | ○ | ○ | ○ | ○ | x |
| ASTM oil No. 1 | ○ | ○ | ○ | ○ | x |
| ASTM oil No. 2 | ○ | ○ | ○ | ○ | x |
| ASTM oil No. 3 | ○ | ○ | ○ | ○ | x |
| Creosote oil | ○ | ○ | ○ | ○ | x |
| Olive oil | ○ | ○ | ○ | ○ | x |
| Hexane | ○ | ○ | ○ | ○ | x |
| Kerosine | ○ | ○ | ○ | ○ | x |
| 10% Aqueous Solution of Ferric Sulfate | ○ | ○ | ○ | ○ | ○ |

Referring to the results given in Table 1, various performance testings were conducted in the following manners.
*1 Melt Viscosity
Measured at 175° C. and a shear rate of $10^3$ sec$^{-1}$ with a rheometer of Instron Co., Ltd.
*2 Tensile Testing
Conducted according to the tensile testing of JIS K6301.
*3 Weathering Resistance
The same test piece as used for the aforesaid tensile testing was subjected to 2000-hour accelerated weathering with a sunshine carbon arc weatherometer to calculate the following value, i.e., a tensile elongation retained, from the following equation:

$$\text{Tensile Elongation Retained (\%)} = \frac{\text{Tensile Elongation After Weathering}}{\text{Tensile Elongation Before Weathering}} \times 100$$

*4 Chemical Resistance
After rectangular test pieces, each of 10 mm × 50 mm × 1.0 mm, were immersed in various chemicals at 23° C. for 24 hours, their appearance was visually observed and estimated by the following ranks.
x ... Dissolved
Δ ... Swollen
○ ... No change

Example 4

A block polymer was synthesized in a similar manner as described in Example 1, except that 553 g of 2-ethylhexyl acrylate was used in place of 553 g of butyl acrylate.

A polymer product wherein molecular weight Mn was 115,000 and Mw was 256,000 was obtained in a yield of 298 g.

The structure of the polymer product was identified with similar procedures as described in Example 1. Calorimetry indicated that there was nothing but Tgs of −85° C. and 104° C. arising from the 2-ethylhexyl acrylate and methyl methacrylate homopolymers. Morphological analysis also identified the polymer product as a block copolymer. From the aforesaid results and the fact that the initiator was bifunctional, it has turned out that the polymer product is an ABA type block copolymer comprising a 2-ethylhexyl acrylate block B and methyl methacrylate blocks A.

The quantity of monomers polymerized into the block of the polymer product was found to be 87.0%, as measured by treating it with acetone for the extraction of the homopolymers.

The polymer product was kneaded at 200° C. and 100 rpm for 5 minutes with a Brabender Plastomill, and was

Example 5

A block polymer was synthesized in a similar manner as described in Example 4, except that 60 g of styrene was used in place of 60 g of methyl methacrylate.

A polymer product wherein molecular weight Mn was 121,000 and Mw was 266,000 was obtained in a yield of 298 g.

The structure of the polymer product was identified in accordance with similar procedures as described in Example 1. Calorimetry indicated that there was nothing but Tgs of −85° C. and 100° C. arising from the 2-ethylhexyl acrylate homopolymer and styrene homopolymer. Morphological analysis also identified the polymer product as a block copolymer. From the aforesaid results and the fact that the initiator was bifunctional, it has turned out that the polymer product is an ABA type block copolymer comprising a 2-ethylhexyl homopolymer block B and styrene homopolymer blocks A.

Table 2 shows the properties of an adhesive tape prepared in a similar manner as in Example 4 with this blockcopolymer.

Example 6

Ninety (90) g of the block copolymer synthesized in Example 4 were dissolved in 210 g of ethyl acetate, and the resulting solution was applied onto a polyester film of 25μ in thickness to a coating thickness of 30μ, as measured after drying, with a bar coater. The product was dried at room temperature for 24 hours to prepare an adhesive tape, the properties of which were as set forth in Table 2.

Example 7

An adhesive tape was prepared in a similar manner as in Example 6, except that 90 g of the block copolymer synthesized in Example 5 was used in place of 90 g of block copolymer synthesized in Example 4 and used in Example 6. The properties of that tape were as set forth in Table 2.

Comparative Example 3

One hundred (100) g of a styrene/isoprene/styrene block copolymer (manufactured by Shell Chemical Co., Ltd. and available in the name of Kaliflex TR-1107) and 100 g of a polyterpene resin (manufactured by Kore Polymer Co., Ltd. and available in the name of Piccolyte A-115) were kneaded together at 180° C. and 100 rpm in a Brabender Plastomill to form a hot-melt type adhesive agent, with which an adhesive tape was prepared in a similar manner as in Example 1. The properties of the obtained adhesive tape were as set forth in Table 2.

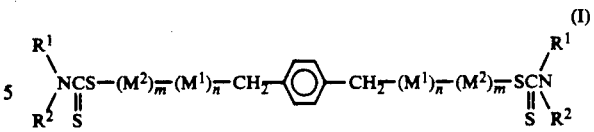

wherein:
two $R^1$s, which may be different or identical, stand for a hydrocarbyl group having 1 to 3 carbon atoms, two $R^2$s, which may be different or identical, stand for a hydrogen atom or a hydrocarbyl group having 1 to 3 carbon atoms, $M^1$ stands for an acrylic ester residue represented by the following formula (a):

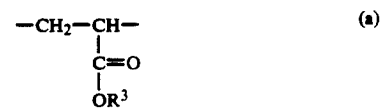

wherein:
$R^3$ is a hydrocarbyl group having 1 to 18 carbon atoms, which may or may not be replaced with an alkoxy or hydroxy group, wherein $M^1$ contains less than 5% by weight with respect to said acrylic ester residue of at least one monomer selected from the group consisting of acrylic acid, methacrylic acid, aromatic vinyl derivatives and vinyl acetate, $M^2$ stands for at least one residue selected from a

TABLE 2

|  | Ex. 4 | Ex. 5 | Ex. 6 | Ex. 7 | Comp. Ex. 3 |
|---|---|---|---|---|---|
| Conversion of Monomers | 98.5 | 98.5 | 98.5 | 98.5 | — |
| Quantity of monomers polymerized into the block (%) | 87 | 86 | 87 | 86 | — |
| Melt Viscosity of Polymer Product*[1] (175° C., $10^{-2}$ sec.) | $4.3 \times 10^2$ | $4.5 \times 10^2$ | — | — | $4.8 \times 10^2$ |
| 180° Peel Testing (g/cm)*[2] | 550 | 530 | 560 | 550 | 500 |
| Ball Tack*[3] | 7 | 7 | 7 | 7 | 5 |
| Retaining Force*[4] | 700 | 720 | 710 | 730 | 400 |
| Deterioration-By-Heat Testing*[5] | 900 | 890 | — | — | not coated due to deterioration |
| Weathering Resistance (g/cm)*[6] | 500 | 480 | 500 | 480 | 300 |

Referring to the results given in Table 2, various performance testings were carried out as stated below.

*[1]Melt Viscosity
Measured at 175° C. and $10^{-2}$ sec. by means of a rheometer of Instron Co., Ltd.

*[2]180° Peel Testing
In accordance with JIS Z-0237, an adhesive tape of 10 mm in width and 100 mm in length was applied onto a stainless plate polished with water-resistant polishing paper No. 280, and was then peeled therefrom at 23° C. and a rate of 300 mm/min. in a direction of 180°.

*[3]Ball Tack
In accordance with JIS Z-0237, an adhesive tape of 10 cm in length was applied at 23° C. onto a slanting surface of a stainless plate slanting at an angle of 30° C., while the adhesive surface was exposed to view. From a position 10 cm above the slanting surface, 30 steel balls of 3/32 to 1 inch in diameter were then permitted to roll down on the slanting surface at the initial speed of 0. The ball tack was represented in terms of the maximum diameter of a ball caused to stop on the adhesive tape.

*[4]Retaining Force
In accordance with JIS Z-0237, an adhesive tape was applied to a similarly treated stainless plate over a contact area of 25 mm × 25 mm, and a load of 1 kg was applied thereto to measure the length of time required for the adhesive tape to dislodge from the stainless plate.

*[5]Deterioration-By-Heat Testing
An adhesive agent was retained in a Geer oven held at 150° C. and in an air atmosphere. Thereafter, the obtained adhesive agent was used under similar conditions as in Ex. 1 to prepare an adhesive agent, with which a testing similar to the 180° peel testing noted in *[2] was conducted.

*[6]Weathering Testing
In accordance with JIS Z-0237, the test piece prepared in *[1] was subjected to 48-hour accelerated weathering with a sunshine carbon arc lamp type weatherometer. Thereafter, a testing similar to the 180° peel testing noted in *[2] was performed.

What is claimed is:
1. An ABA block copolymer represented by the following formula I:

methacrylic acid or ester residue represented by the following formula (b):

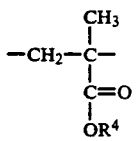

wherein
R⁴ is a hydrocarbyl group having 1 to 4 carbon atoms or a hydrogen atom; an aromatic vinyl residue represented by the following formula (c):

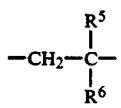

wherein
R⁵ is a hydrogen atom or a methyl group, and
R⁶ is a phenyl or alkylphenyl group; or a maleimido residue represented by the following formula (d):

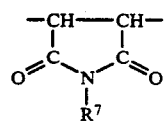

wherein
R⁷ is a hydrocarbyl group having 1 to 12 carbon atoms, or a phenyl or alkylphenyl group, and n and m each stand for a natural number of 20 to 5000, the copolymer having two glass transition temperatures such that a first glass transition temperature is equivalent to a homopolymer of the monomer $M^1$ and a second glass transition temperature is equivalent to a homopolymer of the monomer $M^2$, the first glass transition temperature being substantially lower than the second glass transition temperature.

2. A block copolymer as recited in claim 1, wherein $M^2$ is a methacrylic acid or ester residue of said formula (b) wherein R⁴ denotes a hydrocarbyl group having 1 to 4 carbon atoms or a hydrogen atom.

3. A block copolymer as recited in claim 1, wherein $M^2$ is an aromatic vinyl residue of said formula (c) wherein R⁵ denotes a hydrogen atom or a methyl group, and R⁶ denotes a phenyl or alkylphenyl group.

4. A block copolymer as recited in claim 1, wherein $M^2$ is a maleimido residue of said formula (d) wherein R⁷ denotes a hydrocarbyl group having 1 to 12 carbon atoms, a phenyl group or an alkylphenyl group.

5. A block copolymer as recited in claim 1, wherein $M^2$ is a methacrylic ester residue of said formula (b) wherein R⁴ is a hydrocarbyl group having 1 to 18 carbon atoms.

6. A block copolymer as recited in claim 1, wherein $M^2$ is an aromatic vinyl residue of said formula (c) wherein R⁵ denotes a hydrogen atom, and R⁶ denotes a phenyl group.

7. A block copolymer as recited in claim 1, wherein $M^2$ is a maleimido residue of said formula (d) wherein R⁷ denotes a hydrocarbyl group having 1 to 12 carbon atoms.

8. A block copolymer as recited in claim 1, wherein $—(M^2)_m—$ comprises at least one essential monomeric residue selected from those of said formulae b), (c) and (d) and an optional monomeric residue in an amount of below 5% by weight with respect to said essential monomeric residue.

9. A block copolymer as recited in claim 1, wherein $M^1$ is a butyl acrylate residue, and $M^2$ is a methyl methacrylate residue.

10. A block copolymer as recited in claim 1, wherein $M^1$ is a butyl acrylate residue, and $M^2$ is a styrene residue.

11. A block copolymer as recited in claim 1, wherein $M^1$ is a 2-ethylhexyl acrylate residue, and $M^2$ is a methyl methacrylate residue.

12. A block copolymer as recited in claim 1, wherein $M^1$ is a 2-ethylhexyl acrylate residue, and $M^2$ is a styrene residue.

13. A block copolymer as recited in claim 1, which is in the form of an elastomer, sealant, packing, adhesive material, vibration-proof material, sound absorbing material, soling material or hose.

14. An ABA block copolymer represented by the following formula (I):

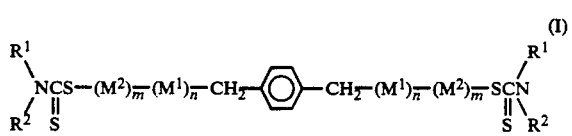

wherein:
two $R^1$s, which may be different or identical, are a hydrocarbyl group having 1 to 3 carbon atoms,
two $R^2$s, which may be different or identical, are a hydrogen atom or a hydrocarbyl group having 1 to 3 carbon atoms,
$M^1$ is an acrylic ester residue represented by the following formula (a):

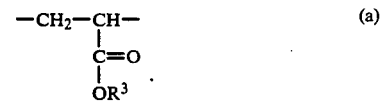

wherein
R³ is a hydrocarbyl group having 1 to 18 carbon atoms, which may or may not be replaced with an alkoxy or hydroxy group, wherein $M^1$ contains less than 5% by weight with respect to said acrylic ester residue of at least one monomer selected from the group consisting of acrylic acid, methacrylic acid, aromatic vinyl derivatives and vinyl acetate,
$M^2$ comprises a maleimido residue having the following formula (d)

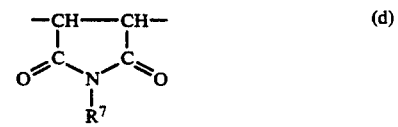

wherein
R⁷ is a hydrocarbyl group having 1 to 12 carbon atoms, or a phenyl or alkylphenyl group, and optionally, a residue selected from a methacrylic acid or ester residue having formula (b)

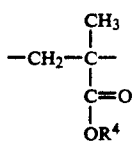 (b)

wherein $R^4$ is a hydrocarbyl group having 1 to 4 carbon atoms or a hydrogen atom; an aromatic vinyl residue represented by the formula (c):

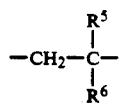 (c)

wherein $R^5$ is a hydrogen atom or a methyl group, and $R^6$ is a phenyl or alkylphenyl group, and n and m are each a natural number of 20 to 5000, the copolymer having two glass transition temperatures such that a first glass transition temperature is equivalent to a homopolymer of the monomer $M^1$ and a second glass transition temperature is equivalent to a homopolymer of the monomer $M^2$, the first glass transition temperature being substantially lower than the second glass transition temperature.

15. The block copolymer of claim 14, wherein $R^7$ is a hydrocarbyl group having 1-12 carbon atoms.

16. The block copolymer of claim 14, wherein $M^1$ is a butyl acrylate residue and —$(M^2)_m$— consists of an N-phenylmaleimido residue and a methylmethacrylate residue.

17. An ABA type block copolymer represented by the structure (I)

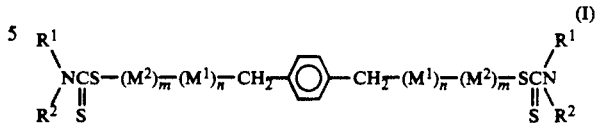 (I)

wherein
two $R^1$s which may be different or identical, are a hydrocarbyl group having 1 to 3 carbon atoms,
two $R^2$s which may be different or identical, are a hydrocarbyl group having 1 to 3 carbon atoms,
$(M^1)_n$ is a polymer block derived from acrylic esters of the formula (a):

 (a)

wherein
$R^3$ is a hydrocarbyl group having 1 to 18 carbon atoms, which may or may not be replaced with an alkoxy or hydroxy group, and optionally including at least one monomer selected from methacrylic acid, acrylic acid, aromatic vinyl derivatives and vinyl acetate;
$(M^2)_m$ is a polymerized block of methyl methacrylate, the number of monomeric units making up each of blocks $(M^2)_m$ and $(M^1)_n$ being 20 to 5000.

* * * * *